United States Patent [19]

Hiraoka et al.

[11] Patent Number: 4,942,972

[45] Date of Patent: Jul. 24, 1990

[54] PRESSURE VESSEL

[75] Inventors: Eiichi Hiraoka, Tokyo; Toshio Akagi, Kawasaki; Kiyotaka Yano, Kiyose; Junji Onaka, Iruma, all of Japan

[73] Assignee: Sumitomo Heavy Industries, Ltd., Tokyo, Japan

[21] Appl. No.: 327,449

[22] Filed: Mar. 22, 1989

[30] Foreign Application Priority Data

Mar. 25, 1988 [JP] Japan ............................ 63-38360[U]

[51] Int. Cl.$^5$ ............................................. B15D 6/12
[52] U.S. Cl. ........................................ 220/3; 220/8
[58] Field of Search ................................... 220/8, 3

[56] References Cited

U.S. PATENT DOCUMENTS 1,506,273  8/1924  Smith ............................. 220/8
2,899,563  8/1959  Stellmacher et al. .............. 220/9

FOREIGN PATENT DOCUMENTS 63-158396  7/1988  Japan.

Primary Examiner—Joseph Man-Fu Moy
Attorney, Agent, or Firm—Armstrong, Nikaido, Marmelstein, Kubovcik & Murray

[57] ABSTRACT

A pressure vessel includes a cylindrical, fixed body which is closed at the two ends thereof, the central portion of the body forming a sample accommodating space, and a drum body provided in such a manner as to be rotatable relative to the outer periphery of the body. The body has an opening in a lateral portion thereof, and the drum body 3 has an opening at a position which faces the opening formed in the body at one rotated position.

6 Claims, 3 Drawing Sheets

PRESSURE VESSEL

BACKGROUND OF THE INVENTION

1. Field of the Invention:

The present invention relates to a pressure vessel, and more particularly, to a pressure vessel which is designed to facilitate insertion and take-out of a sample.

2. Description of the Prior Art:

In conventional pressure vessels, when a sample is placed in and taken out of the vessel, a lid of the vessel is opened and closed at reduced pressure by a lid opening/closing device. However, such a pressure vessel has a disadvantage that the lid opening/closing device has a complicated structure and that the operation thereof is also complicated.

Accordingly, the present inventors disclosed a device for automatically opening/closing a lid of a pressure vessel in the specification of Japanese Patent Laid-Open No. 63-158396.

This pressure vessel includes a cylindrical body which forms a drum body of a vessel, and two lids which are respectively fitted into the openings formed at the two ends of the cylindrical body. The two lids are coupled to each other by a tie rod to form one unit, and are made to be slidable through the cylindrical body.

SUMMARY OF THE INVENTION

The present invention is directed to the improvement in a lid opening/closing structure of a conventional pressure vessel, and the improvement in the lid opening/closing operation.

To this end, the present invention provides a pressure vessel which comprises a cylindrical, fixed body which is closed at the two ends thereof, the central portion of the body forming a sample accomodating space, the body having an opening in a drum portion thereof, and a drum body provided in such a manner as to be rotatable relative to the outer periphery of the body, the drum body having an opening at a position which faces the opening formed in the body.

In the pressure vessel of the present invention, when a sample is placed in the pressure vessel to be processed or the processed sample is taken out of the pressure vessel, an opening a formed in the body 1 and an opening b formed in the drum body 3 are aligned to each other. During processing, the space between the body 1 and the drum body 3 is completely sealed by a gasket provided around the opening a formed in the body 1.

DETAILED DESCRIPTION OF THE PREFERRED EMBODIMENTS

Figure 1:
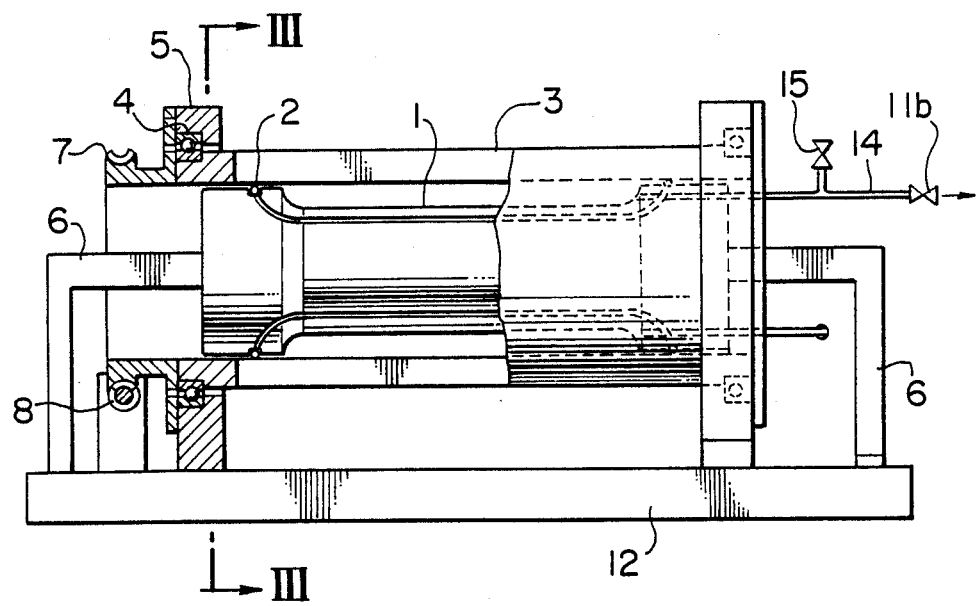
FIG. 1 is a front view of a pressure vessel, showing a first embodiment of the present invention.
Figure 3:
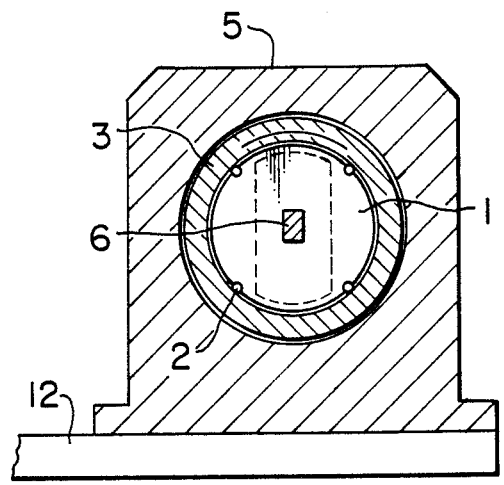
FIG. 3 is a section taken along the line III—III of FIG. 1.
Figure 2:
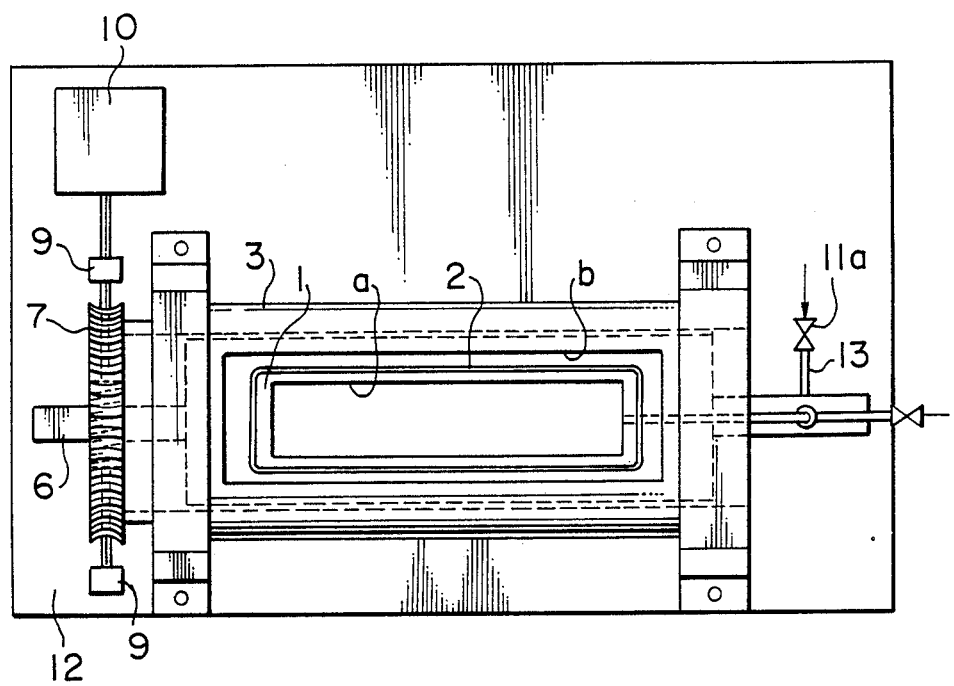
FIG. 2 is a plan view of the pressure vessel of FIG. 1.
Figure 4:
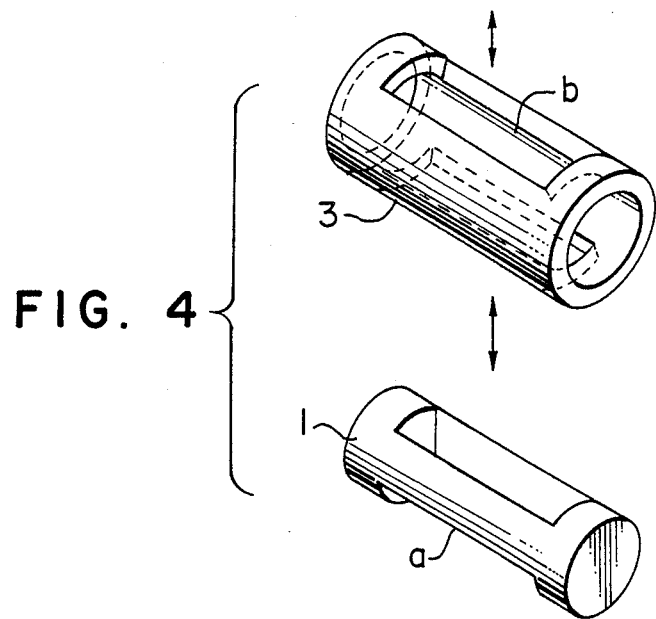
FIG. 4 is a perspective view of a body and a drum body.

A first embodiment of the present invention will be described below with reference to FIGS. 1 to 4. A cylindrical body 1 is closed at the two ends thereof. It has upper and lower openings a formed in the central portion thereof at positions which are symmetrical with respect to the central axis. The openings a are elongated in the axial direction. A gasket 2 is provided around each of the openings a to provide for sealing. The body 1 is supported at the central portion of each of the two ends by supporting members 6 fixed to a bed 12.

A drum body 3 is provided in such a manner that it covers the outer periphery of the body 1. The drum body 3 is rotatable relative to the body 1. Like the body 1, the drum body 3 has upper and lower openings b formed at positions which face the openings a formed in the body 1. The openings b are also elongated in the axial direction. The openings b may be made larger than that of the openings a in the body 1 so as to facilitate exchange of the gasket 2 provided around the openings formed in the body 1. The drum body 3 has a cylindrical form, and is supported at the two ends thereof by bearings 4 received in bearing boxes 5 mounted on the bed 12.

A worm wheel 7 is mounted on one end (the left end as viewed in the figures) of the drum body 3. A worm shaft 8 engages with this worm wheel 7. The worm shaft 8 is supported by bearings 9, and is driven by a motor 10 with a speed reducer. Reference numerals 11a and 11b denote a fluid inlet valve and a fluid outlet valve, respectively. A fluid to be processed is supplied into the body 1 from the inlet valve 11a through piping 13, and is discharged from the outlet valve 11b through piping 14. A reference numeral 15 designates a purging valve.

Next, the operation of the thus-arranged pressure vessel will be described. First, a sample is placed in a wire cage, and this cage with the sample is placed within the body 1 through one of the openings a. The motor 10 is driven to rotate the drum body 3 through 90 degrees. Next, the inlet valve 11a is opened so that the fluid can flow into the body 1, the sample placed in the body 1 is processed for a required period of time, and the internal pressure of the body is reduced to the atmospheric pressure. Subsequently, the motor 10 is driven to rotate the drum body 3 by 90 degrees in the opposite direction so that the openings a are aligned to the openings b. The wire cage with the sample placed therein is taken out from the upper opening (it may also be taken out from the lower opening, if necessary).

Figure 5:
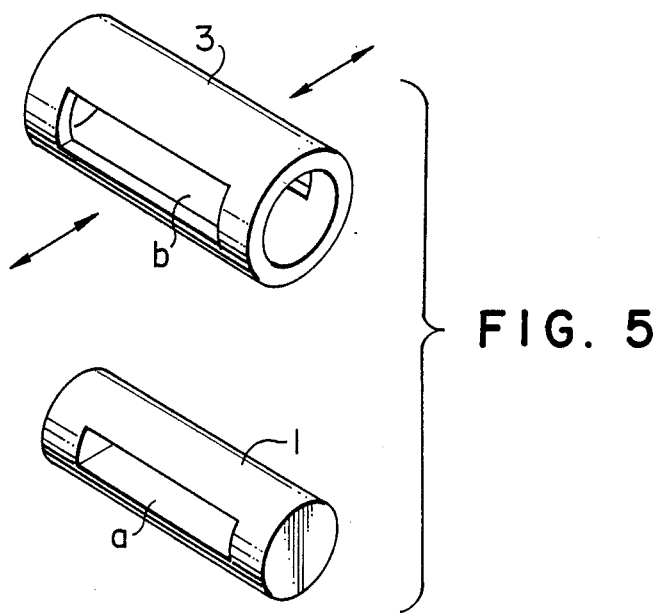
FIG. 5 is a perspective view of the body and the drum body, showing a second embodiment of the present invention.

FIG. 5 shows another embodiment of pressure vessel. In this embodiment, the body 1 and the drum body 3 respectively have openings formed in the sides thereof at positions which face each other. This enables the sample to be inserted into and taken out of the body from the side thereof. Other components of this embodiment are the same as those of the first embodiment, description thereof being omitted.

In the above-described embodiments, the openings are formed in the body and the drum body at positions which are 180 degrees out of phase with each other. However, if the sample is inserted into or taken out of the body only from one side thereof, only one opening may be formed in the body and in the drum body.

As will be understood from the foregoing description, in the present invention, the drum body having the openings in the upper and lower portions or in the two sides is provided in such a manner as to be rotatable with respect to the fixed body having the openings in the upper and lower portions or in the two sides thereof. When the sample placed in the body is to be processed, the drum body is rotated by 90 degrees, and this allows the space between the body and the drum body to be sealed by the gaskets provided on the body. In consequence, mounting and dismounting of the lids of the conventional pressure vessel can be replaced by the rotation of the drum body, thus facilitating the operation of the pressure vessel.

Since the loads applied to the bottom walls of the right and left portions of the body are balanced while the pressure is being raised, it is not required that the body is held from the outside thereof.

The driving device can be simplified.

Since the pressure vessel of this invention does not incorporate a lid mounting/dismounting device, the overall size of the vessel can be made smaller.

The gaskets can be replaced with new ones easily.

What is claimed is:

1. A pressure vessel, comprising:
    a cylindrical, fixed body which is closed at the two ends thereof, the central portion of said body forming a sample accommodating space, said body having a opening formed in at least one lateral portion thereof; and
    a drum body surrounding said fixed body in such a matter as to be rotatable relative to the outer periphery of said body, said drum body having an opening formed in a lateral portion at a position which faces said opening formed in said body at one point rotation.

2. A pressure vessel according to claim 1, wherein said openings formed in said cylindrical body and said drum body, respectively, consist of two openings formed at positions which are circumferentially 180 degrees from each other.

3. A pressure vessel, comprising:
    a cylindrical body closed at the ends and having a sample accommodating space created by an opening in a lateral portion of said cylindrical body, said body being fixed to a support means so as to prevent both axial and rotational movement thereof;
    a drum body surrounding said cylindrical body and having a cylindrical inner surface accommodating therewithin said cylindrical body, said drum body being mounted on said support means so as to have rotational movement with respect to said cylindrical body, said drum body having an opening formed therethrough in a position on a lateral surface thereof corresponding to the opening in said cylindrical body therewithin; and
    means for rotating said drum body with respect to said cylindrical body to bring said drum body opening into and out of registration with said sample accommodating space.

4. A pressure vessel according to claim 3, wherein a gasket means is provided between said cylindrical body and said drum body to seal said sample accommodating space by said inner cylindrical surface of said drum body when said drum body opening is out of registration with said sample accommodating space.

5. A pressure vessel according to claim 4, wherein said cylindrical body is fixed to said support means at said closed ends, and said drum body is mounted on said support means coaxially with said cylindrical body by rotational bearing means.

6. A pressure vessel according to claim 5, wherein said means for rotating said drum body includes a motor fixed to said support means and a worm gear connecting said motor to said drum body.

* * * * *